United States Patent
Ferguson et al.

[11] Patent Number: 6,027,177
[45] Date of Patent: Feb. 22, 2000

[54] METHOD AND AN APPARATUS FOR CONTROLLABLY RELEASING A MECHANICAL BRAKE ON A HYDROSTATIC MACHINE

[75] Inventors: Alan L. Ferguson; Conrad G. Grembowicz; Timothy M. Gutzwiller, all of Peoria, Ill.

[73] Assignee: Caterpillar Inc., Peoria, Ill.

[21] Appl. No.: 08/994,160

[22] Filed: Dec. 19, 1997

[51] Int. Cl.$^7$ ............................................ F16D 31/02
[52] U.S. Cl. ..................... 303/3; 303/15; 180/6.48; 180/307; 60/452
[58] Field of Search ................... 303/9.15, 20, 24.1, 303/192; 180/6.48, 305, 306, 307, 308; 60/451, 452

[56] References Cited

U.S. PATENT DOCUMENTS

| | | | |
|---|---|---|---|
| 4,076,090 | 2/1978 | Krusche et al. | 180/6.48 |
| 4,544,992 | 11/1985 | Kassai | 180/307 |
| 5,362,138 | 11/1994 | Clemens et al. | 303/50 |
| 5,368,137 | 11/1994 | Clemens | 188/71.5 |
| 5,573,312 | 11/1996 | Muller et al. | 303/3 |
| 5,653,107 | 8/1997 | Beck | 60/452 |

*Primary Examiner*—Matthew C. Graham
*Attorney, Agent, or Firm*—Byron G. Buck, II

[57] ABSTRACT

A controllable mechanical brake release system for controllably releasing a mechanical brake included in a hydrostatic machine is disclosed. In the preferred embodiment the hydrostatic machine is located on an incline. The mechanical brake is included in a mechanical braking system. The hydrostatic machine has the braking system, a hydrostatic propulsion system and a controller. A determined hydraulic pressure associated with the hydrostatic propulsion system is compared with an established trip indicator. A release mechanical brake signal is produced in response to the comparison.

4 Claims, 3 Drawing Sheets

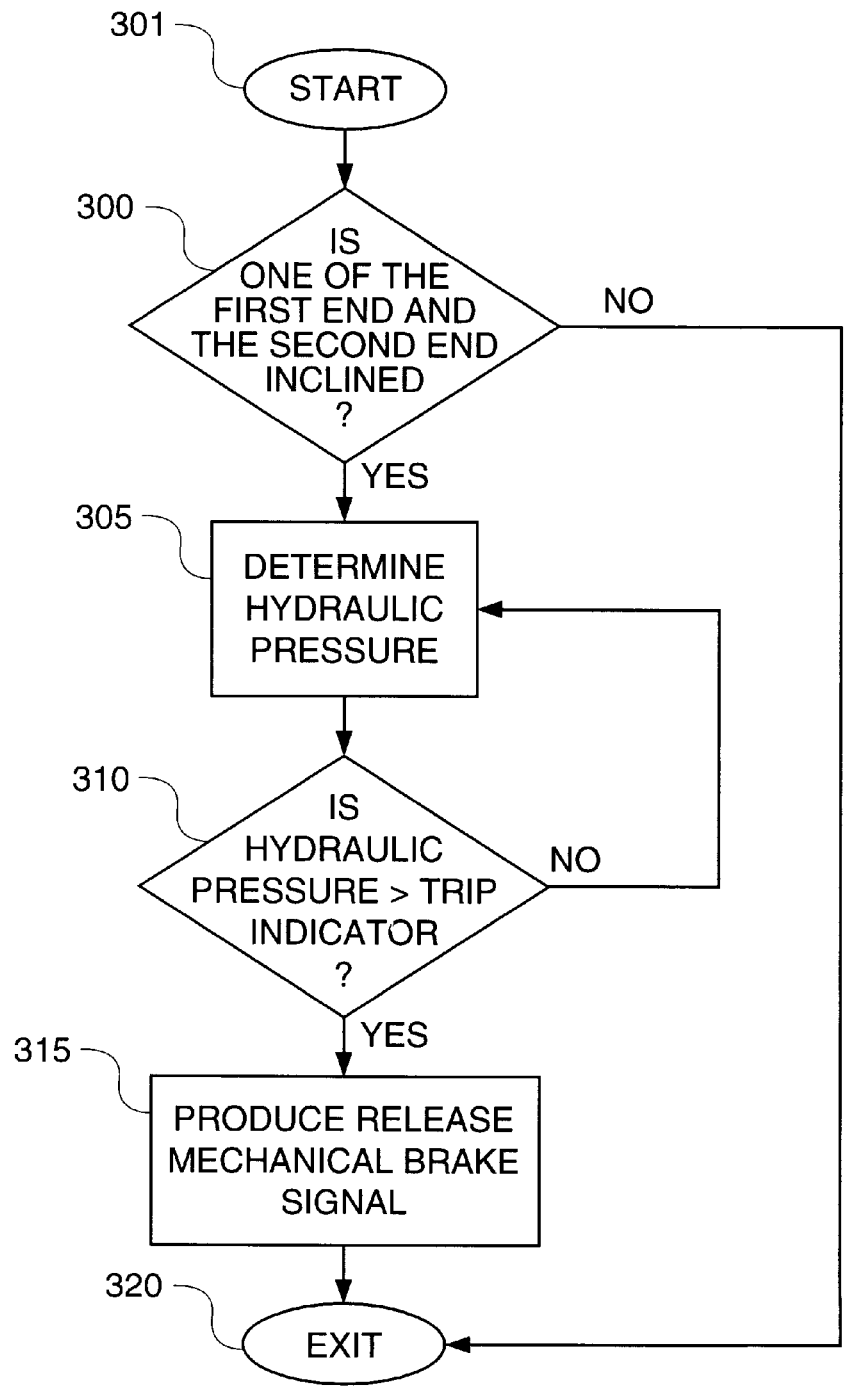

METHOD AND AN APPARATUS FOR CONTROLLABLY RELEASING A MECHANICAL BRAKE ON A HYDROSTATIC MACHINE

TECHNICAL FIELD

This invention relates generally to a method and an apparatus for a controllable mechanical brake release system on a hydrostatic machine and more particularly to a method and an apparatus for a controllable mechanical brake release system on a hydrostatic machine while the hydrostatic machine is located on an incline.

BACKGROUND ART

Typically, a hydrostatic machine has a hydrostatic system which includes an engine, at least one hydraulic pump, and at least one hydraulic motor. The engine drives the hydraulic pump. The hydraulic pump provides hydraulic flow to the hydraulic motor which drives the machine wheels. The hydrostatic machine also has a mechanical brake which is used in addition to the hydrostatic system to stop the hydrostatic machine. The brake is usually spring applied and hydraulically released.

A typical sequence for starting the hydrostatic machine from a stopped position is to first release the mechanical brake, then apply the hydrostatic propulsion system. This sequence prevents the hydrostatic system from "fighting" the mechanical brake which may occur when the hydrostatic propulsion system is driving the wheels or the tracks while the mechanical brake is still engaged.

However, when the hydrostatic machine is located on an incline and is started from a stopped position, the force of gravity acting on the mass of the hydrostatic machine may be greater than the hydraulic pressure currently in the hydrostatic system. When this occurs, the hydrostatic machine may uncontrollably roll down the incline, after the mechanical brake has been released. The hydrostatic machine will continue to roll down the incline until the hydraulic system pressure is sufficient to overcome the force of gravity acting on the mass of the hydrostatic machine.

The present invention is directed to overcoming one or more of the problems as set forth above.

DISCLOSURE OF THE INVENTION

In one aspect of the present invention, a method for controllably releasing a mechanical brake included in a mechanical braking system located in a hydrostatic machine is disclosed. The hydrostatic machine includes a first end, a second end, a hydrostatic propulsion system, and a controller in communication with the mechanical braking system and the hydrostatic propulsion system. A trip indicator is established. A determination is made in regard to one of the first end and the second end being inclined. A hydraulic pressure, associated with the hydrostatic propulsion system, is determined. The hydraulic pressure is compared with the trip indicator, and a release mechanical brake signal is produced in response to the comparison.

In a second aspect of the present invention, a controllable mechanical brake release system for a hydrostatic machine is disclosed. The hydrostatic machine has a first end, a second end, a controller, a hydrostatic propulsion system, and a mechanical braking system having a mechanical brake. The controller is configured to communicate with the mechanical braking system and the hydrostatic propulsion system. Stored in the controller, is a trip indicator. An inclination indicator located in the hydrostatic machine, is configured to communicate with the controller when one of the first end and the second end is inclined. A release mechanical brake signal is configured to be communicated to the mechanical braking system.

In a third aspect of the present invention, a controllable mechanical brake release system in a hydrostatic machine is disclosed. The hydrostatic machine has a first end, a second end, a controller, a hydrostatic propulsion system, and a mechanical braking system having a mechanical brake. The controller is configured to communicate with the mechanical braking system and the hydrostatic propulsion system. Stored in the controller, is a trip indicator. An inclination indicator located in the hydrostatic machine, is configured to communicate with the controller when one of the first end and the second end is inclined. A release mechanical brake signal is configured to be communicated to the mechanical braking system.

These and other aspects and advantages of the present invention, as defined by the appended claims, will be apparent to those skilled in the art from reading the following specification in conjunction with the drawings and the claims.

BRIEF DESCRIPTION OF THE DRAWINGS

For a better understanding of the invention, reference may be made to the accompanying drawings, in which:

FIG. 3 is a is a flow chart illustrating software logic used in connection with a preferred embodiment of the present invention.

BEST MODE FOR CARRYING OUT THE INVENTION

The present invention provides a method and an apparatus for a controllable mechanical brake release system on a hydrostatic machine. The controllable mechanical brake release system, in the preferred embodiment, will be applied when the hydrostatic machine is located on an incline. The following description uses an asphalt paver as an example only. This invention can be applied to other types of hydrostatic machines having a hydrostatic propulsion system and a mechanical braking system. Other examples of hydrostatic machines are compactors, some types of loaders, and some types of tractors.

Figure 1:
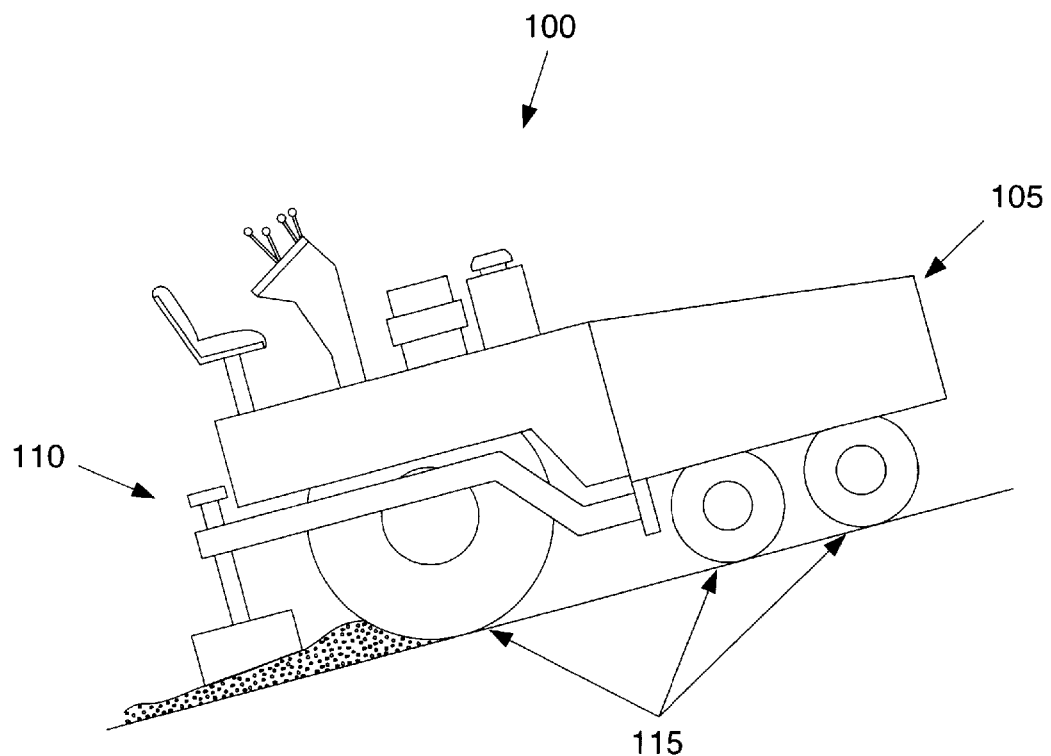
FIG. 1 is a side view illustrating a preferred embodiment of the hydrostatic machine.

Referring to FIG. 1 a side view of a hydrostatic machine 100, in this case an asphalt paver, a first end 105 and a second end 110 is shown. The hydrostatic machine 100 is shown on an incline having the first end 105 being elevated above the second end 110. However, in the preferred embodiment the invention will be applied when either the first end 105 or the second end 110 is elevated. The hydrostatic machine 100 is supported by a plurality of wheels 115. Although, the embodiment is shown with respect to a plurality of wheels 115 supporting the hydrostatic machine 100, one skilled in the art could readily implement the present invention in connection with tracks supporting the hydrostatic machine 100.

Figure 2:
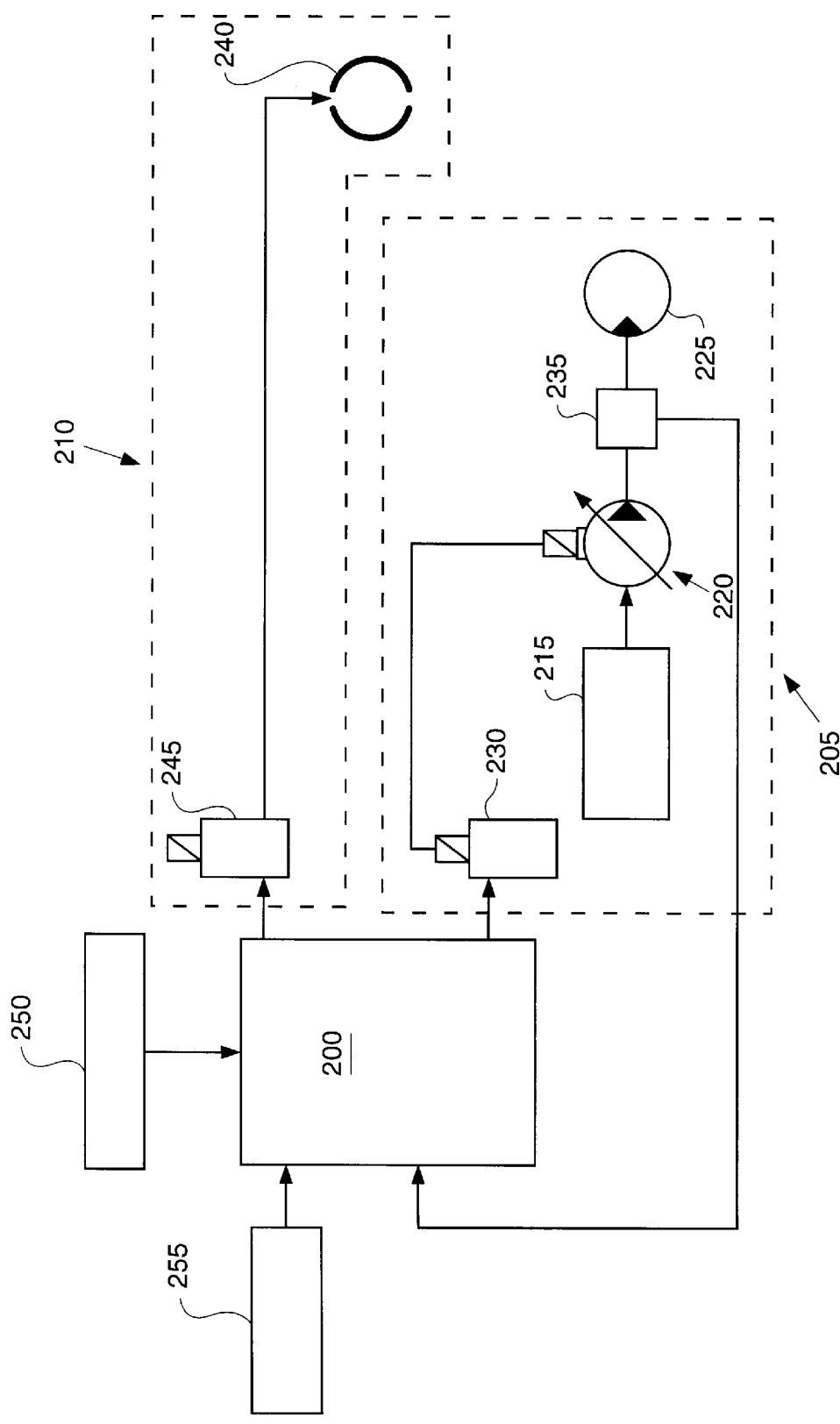
FIG. 2 is a block diagram illustrating an embodiment of the controllable mechanical brake release system.

Referring to FIG. 2, a block diagram illustrating an embodiment of the controllable mechanical brake release system is shown. The controllable mechanical brake release system includes a controller 200 in communication with a hydrostatic propulsion system 205 and with a mechanical braking system 210. The controller 200 used in the preferred embodiment is a Motorolla microcontroller, model no. 68HC11. However, many suitable controllers including analog and/or digital circuitry may be used in connection with the present invention, as would be known to one skilled in the art.

The hydrostatic propulsion system 205 has an engine 215, a hydraulic pump 220, and a hydraulic motor 225. The engine 215 drives the hydraulic pump 220. The hydraulic pump 220 provides hydraulic flow to the hydraulic motor 225. The hydraulic motor 225 converts the hydraulic flow to a rotational motion that drives at least one of the wheels 115 of the hydrostatic machine 100. By varying the output of the hydraulic pump 220, the driving speed of the hydrostatic machine 100 can be controlled.

Although, the embodiment is shown with respect to the engine 215 driving the hydraulic pump 220, one skilled in the art could readily implement the present invention in connection with the engine 215 driving a plurality of the hydraulic pumps 220. Also, the embodiment is shown with respect to the hydraulic pump 220 providing hydraulic flow to one hydraulic motor 225. One skilled in the art could readily implement the present invention in connection with the hydraulic pump 220 providing hydraulic flow to a plurality of the hydraulic motors 225. The use of the engine 215 driving at least one of the plurality of hydraulic pumps 220, and the hydraulic pump 220 providing a hydraulic flow to at least one of the hydraulic motors 225, is well known in the art. One skilled in the art could easily and readily implement such a plurality of hydraulic pumps 220 and a plurality of hydraulic motors 225 in connection with a hydrostatic machine 100 using the present invention.

Included in the hydrostatic propulsion system 205 is a hydraulic pressure sensor 235 and a propulsion switch 230. The hydraulic pressure sensor 235 is configured to monitor the hydraulic pressure in the hydrostatic propulsion system 205, and communicate the hydraulic pressure to the controller 200. The propulsion switch 230 is configured to controllably operate the hydraulic pump 220 in response to a communication from the controller 200. In the preferred embodiment the propulsion switch 230 is a solenoid switching device, however, many suitable switching devices may be used in connection with the present invention as would be known to one skilled in the art.

The mechanical braking system 210 includes a mechanical brake 240 and a mechanical brake switch 245. In the preferred embodiment, the mechanical brake 240 is spring actuated, normally locked brakes that are fluid releasable, however, many suitable mechanical brakes may be used in connection with the present invention as would be known to one skilled in the art. The mechanical brake switch 245 is configured to controllably release the mechanical brake 240 in response to a communication received from the controller 200. In the preferred embodiment the mechanical brake switch 245 is a solenoid switching device, however, many suitable switching devices may be used in connection with the present invention as would be known to one skilled in the art.

An inclination indicator 255, located on the hydrostatic machine 100, is configured to communicate with the controller 200 when one of the first end 105 and the second end 110 is elevated. In the preferred embodiment, the inclination indicator 255 is an inclination or level sensor. However, the inclination indicator 255 may be a level indicator switch (not shown) activated by the hydrostatic machine operator when one of the first end 105 and the second end 110 is elevated. Many suitable inclination indicators 255 configured to communicate with the controller 200 when one of the first end 105 and the second end 110 is elevated may be used in connection with the present invention without departing from the scope of the invention.

A trip indicator 250 is a value that represents a pressure determined to be enough to overcome the force of gravity acting on the hydrostatic machine 100 when the mechanical brake 240 is released. In the preferred embodiment, the trip indicator 250 is a value determined by the controller 200. The controller 200 may determine the trip indicator 250 from various inputs. One example being, the slope of the incline indicated by the inclination indicator 255, and the force created by the mass of the hydrostatic machine 100 may be inputs used by the controller 200 to determine the trip indicator 250. Another example, of inputs the controller 200 may use to determine the trip indicator is the slope of the incline indicated by the inclination indicator 255, and the hydraulic pressure monitored by the hydraulic pressure sensor 235. However, one skilled in the art could readily implement the present invention in connection with a trip indicator 250 being a predetermined fixed value stored in a memory device associated with the controller 200. The input value may be provided to the controller 200 by either a electronic service tool or during the manufacturing process.

Referring to FIG. 3, a flow chart illustrating software logic used in connection with an embodiment of the controllable mechanical brake release system is shown. The program control for the controllable mechanical brake release system will only be applied when it is desired to start the hydrostatic machine 100 moving from a stopped position. In a starting block 301, program control of a preferred embodiment of the present invention begins. Program control passes to a first decision block 300, where the controller 200 determines if one of the first end 105 and the second end 110 is inclined using a signal received from the inclination indicator 255. If, one of the first end 105 and the second end 110 is not inclined, the program control passes to ending block 320 and program control of a preferred embodiment of the present invention ends. If, one of the first end 105 and the second end 110 is inclined, the program control passes to block 305.

In block 305, the controller 200 determines the hydraulic pressure in the hydrostatic propulsion system 205 using a signal received from the hydraulic pressure sensor 235. Program control next passes to the second decision block 310.

In the second decision block 310 the controller 200 determines if the hydraulic pressure is greater than the trip indicator 250. If, the hydraulic pressure is less than or equal to the trip indicator 250, the program control will loop back to block 305 where the controller 200 will again determine the hydraulic pressure in the hydrostatic propulsion system 205 using a signal received from the hydraulic pressure sensor 235. If, the hydraulic pressure is greater than the trip indicator 250, program control will pass to the next block 315 where the controller 200 produces a release mechanical brake signal. The release mechanical brake signal is communicated with the mechanical braking system 210. In an ending block 320, program control of a preferred embodiment of the present invention ends.

While aspects of the present invention have been particularly shown and described with reference to the embodiment above, it will be understood by those skilled in the art that various additional embodiments may be contemplated without departing from the spirit and scope of the present invention. For example, referring to FIG. 3, decision block 310 when the controller 200 determines the hydraulic pressure is less than or equal to the trip indicator 250, the program control may pass to the starting block 301 where program control of the embodiment of the present invention begins, instead of passing to block 305. However, such devices and methods should be understood to fall within the scope of the present invention as determined based upon the claims below and any equivalence thereof.

Industrial Applicability

The controllable mechanical brake release system disclosed herein, is preferably used when the hydrostatic machine is located on an incline and is started from a stopped position. By using the present invention, the hydrostatic machine may not start moving. Unless the hydraulic pressure in the hydrostatic propulsion system needed to controllably move the machine is great enough to overcome the force of gravity acting on the mass of the hydrostatic machine, the mechanical brake will not be released.

Other aspects, objects and advantages of the present invention can be obtained from a study of the drawings, the disclosure and the appended claims.

We claim:

1. A method for controllably releasing a mechanical brake included in a mechanical braking system located in a hydrostatic machine, the hydrostatic machine having a first end and a second end and includes a hydrostatic propulsion system and a controller, and the controller being in communication with the mechanical braking system and the hydrostatic propulsion system, including the steps of:

establishing a trip indicator;

determining if one of the first end and the second end is inclined;

determining a hydraulic pressure associated with the hydrostatic propulsion system;

comparing the hydraulic pressure with the trip indicator; and producing a release mechanical brake signal in response to comparing the hydraulic pressure with the trip indicator.

2. A method as set forth in claim 1, wherein the step of comparing the hydraulic pressure with the trip indicator includes the step of producing a release mechanical brake signal in response to the hydraulic pressure being greater than the trip indicator.

3. A method as set forth in claim 1, wherein the step of establishing a trip indicator includes the step of providing the trip indicator by means of a service tool.

4. A method as set forth in claim 1, wherein the step of establishing a trip indicator includes the step of providing the trip indicator during the manufacturing process of the hydrostatic machine.

* * * * *